United States Patent [19]

Bunten

[11] 3,796,820

[45] Mar. 12, 1974

[54] TERMINAL BOX FOR UNDERGROUND CONDUCTORS

[75] Inventor: Theodore M. Bunten, Rydal, Pa.

[73] Assignee: Repco Products Corporation, Philadelphia, Pa.

[22] Filed: Mar. 2, 1973

[21] Appl. No.: 337,335

[52] U.S. Cl. .......................... 174/38, 174/51, 174/60
[51] Int. Cl. .............................................. H02g 9/02
[58] Field of Search ......... 174/38, 50, 51, 52 R, 60; 317/120

[56] References Cited
UNITED STATES PATENTS
522,664   7/1894   Kleinsteuber et al. ................ 174/60
547,078   10/1895  Johnson ................................. 174/60
2,953,625 9/1960   Hasselhorn ........................... 174/60
3,604,835 9/1971   Hamilton .............................. 174/38

Primary Examiner—Laramie E. Askin
Attorney, Agent, or Firm—Seidel, Gonda & Goldhammer

[57] ABSTRACT

A terminal box for underground conductors includes a pivotable panel behind which unassigned conductor loops may be supported with assigned conductor loops spliced to the panel. The panel is mounted for pivotable movement to expose structure therebehind. In all pivotable positions of the panel, it is grounded by means of contact members spring-biased into engagement with one another with one contact member being connected to lower bracket means.

15 Claims, 5 Drawing Figures

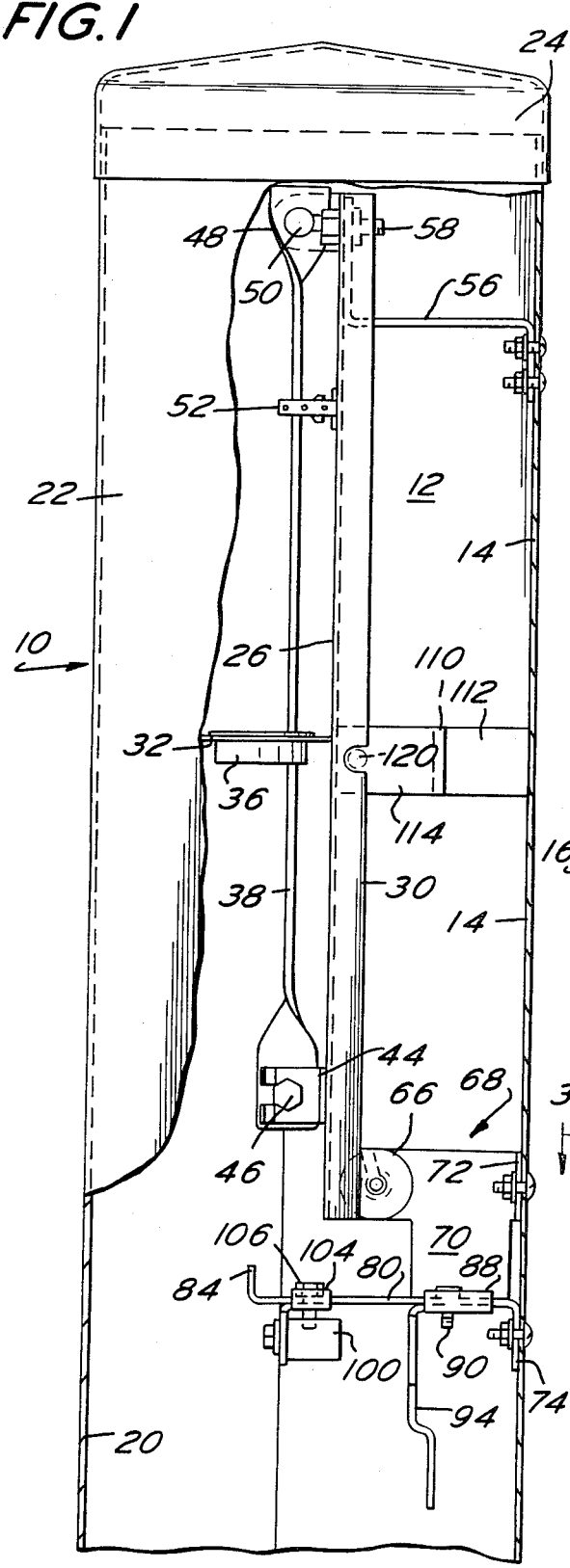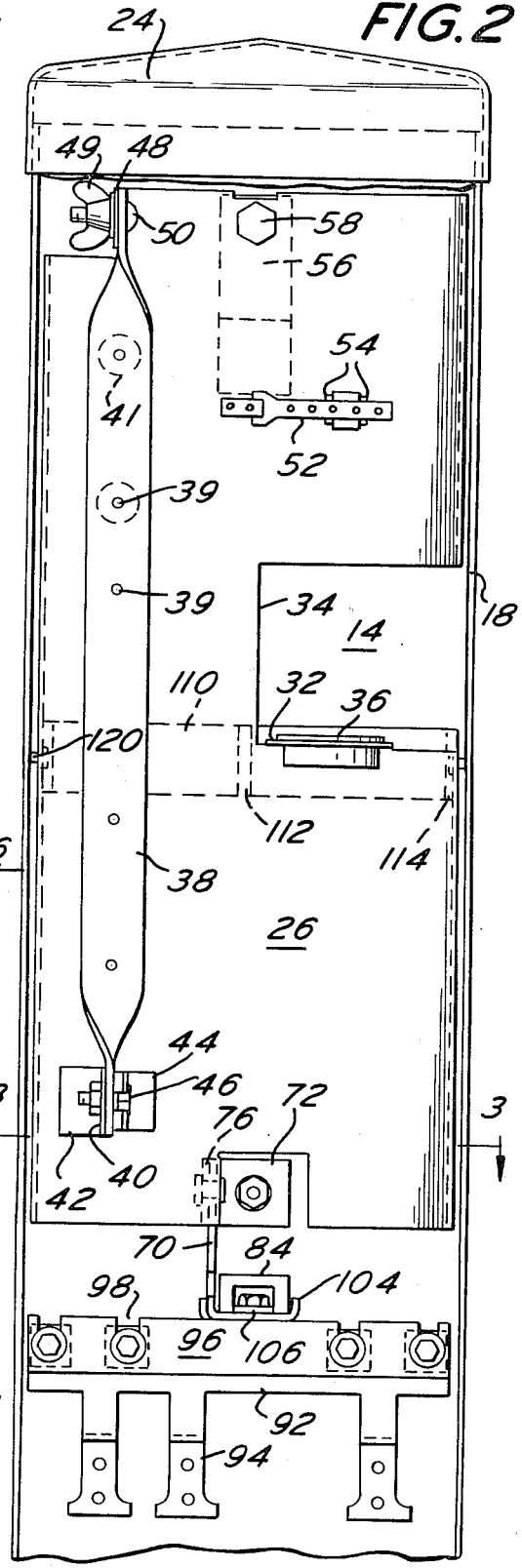

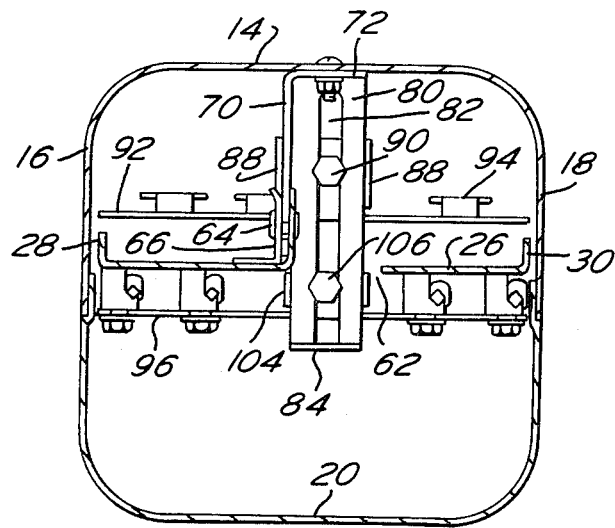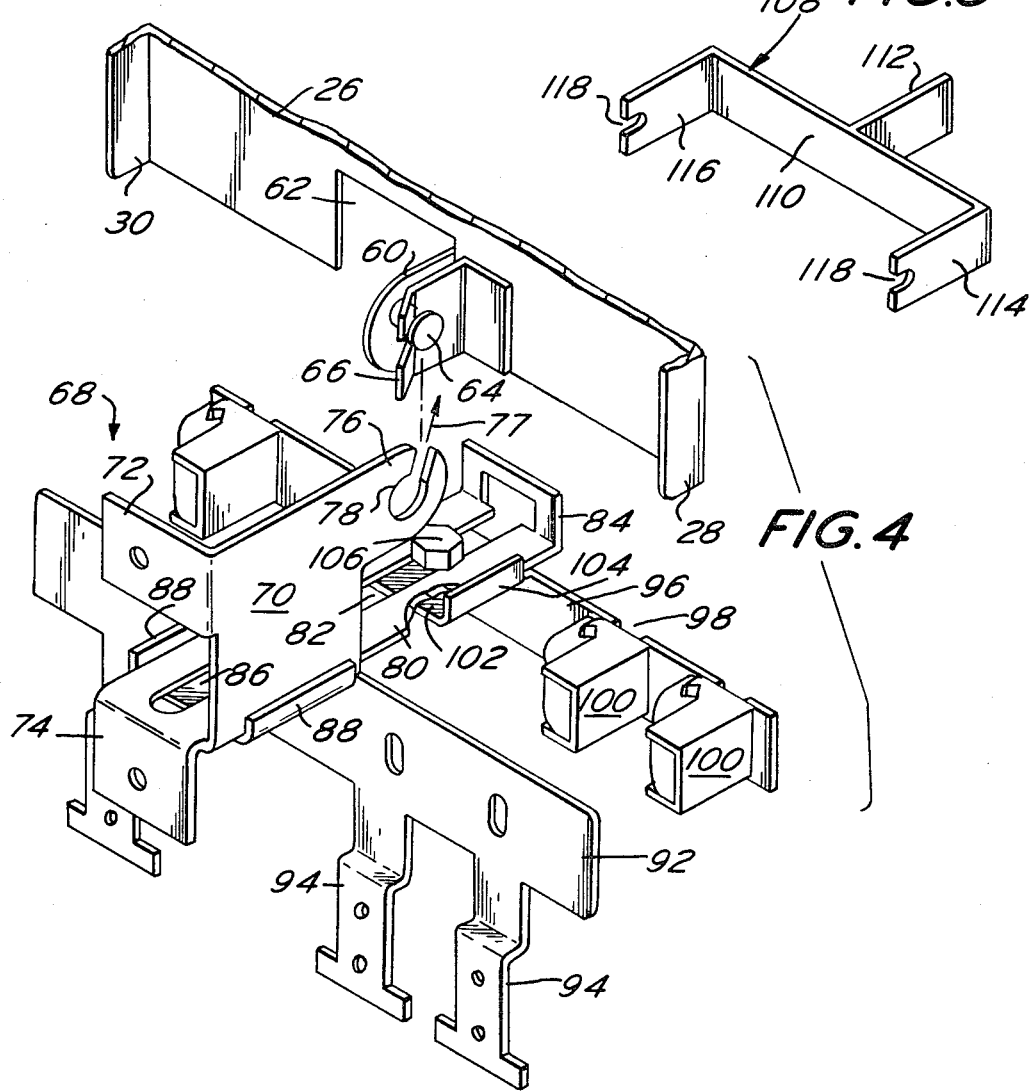

TERMINAL BOX FOR UNDERGROUND CONDUCTORS

This invention relates to a terminal box, and more particularly to a terminal box adapted for use with underground conductors such as telephone cables. Within the terminal box, there will be a loop of unassigned conductors which merely enter the terminal box and then exit from the terminal box. Some of the conductors which enter the terminal box will be assigned to particular subscribers and will be spliced to equipment or devices within the terminal box and supported by a movable panel therein.

Terminal boxes, per se, are known to those skilled in the art. For example, see U. S. Pats. Nos. 2,953,625 and 3,604,835. Each of those patents discloses a pivotable panel within the terminal box for supporting components which must be grounded. A conventional manner of effecting grounding of a supporting panel as disclosed in said patents includes the use of a grounding wire or strap which must be loosened and unloosened in the field. The field operators have a tendency to forget the grounding wire or strap and consider it a nuisance when seeking access to components on a rear surface of the panel.

In accordance with the present invention, the pivotably movable panel which divides the interior of the terminal box into front and rear chambers is grounded in a novel manner. One projection member on the panel is spring-biased into engagement with a mating member supported by the terminal box in all positions of the panel. In addition, said mating members constitute the pivotable joint for the panel. Thus, a pin extends through the mating members and facilitates pivotable movement of the panel.

It is an object of the present invention to provide a terminal box having a pivotable panel grounded in a novel manner.

It is another object of the present invention to provide a terminal box panel which is grounded in all pivotable positions thereof without requiring any action on the part of an operator.

It is another object of the present invention to provide a novel means for pivotably mounting a panel in a terminal box while automatically attaining a grounding of the panel.

It is another object of the present invention to provide a terminal box for underground cable which is structurally interrelated in a novel manner while being simple and reliable.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a side elevation view of a terminal box in accordance with the present invention with portions of the side wall broken away for purposes of illustration.

FIG. 2 is a front elevation view of the terminal box of the present invention with portions broken away for purposes of disclosure.

FIG. 3 is a sectional view taken along the line 3—3 in FIG. 2.

FIG. 4 is a rear partial perspective view on an enlarged scale and exploded to show the relationship between the panel and the lower bracket means.

FIG. 5 is a perspective view of a splice support bracket.

Referring to the drawing in detail, wherin like numerals indicate like elements, there is shown in FIG. 1 a terminal box designated generally as 10. The terminal box 10 includes a housing designated generally as 12 and preferably made from metal, but may be made from other materials, if desired.

The housing 12 includes a rear wall 14 having parallel side flanges 16 and 18 extending toward the front wall 20. A portion of the front wall 20 includes a removable cover 22 positioned at the upper end of the housing 12. The housing 12 includes a hood 24. The end of the housing 12 remote from the hood 24 is open so that an underground cable may extend upwardly into the interior of the housing 12 and then exit through the open bottom end of the housing 12. Within the housing 12, there is provided a sheet metal panel 26 having side flanges 28 and 30 extending rearwardly toward the rear wall 14.

As shown more clearly in FIGS. 1 and 2, a flange-like projection 32 is struck from the panel 26 and bent forwardly at an angle of approximately 90° with respect to the panel 26 to thereby define the slot or notch 34. The projection 32 is provided with a hole therein so that it may receive a cable socket 36. Cable socket 36 is snapped in place and preferably made from an electrically non-conductive material such as polymeric plastic.

As shown more clearly in FIGS. 1 and 2, a bracket 38 is provided with mounting holes 39. The panel 26 may be provided with holes 41 aligned with the holes 39. A flange-like projection 40 is struck from the panel 26 to thereby define a hole 42. The projection 40 lies in a plane perpendicular to the plane of the panel 26. A mating bracket 44 is fixedly secured to the panel 26. A bolt 46 extends through aligned holes or notches in the bracket 44 and projection 40 to thereby provide a pivotable mounting for the strap-like bracket 38.

The bracket 38 may pivot about the axis of bolt 46 from the position shown in FIG. 1 to a position wherein it is generally perpendicular to the plane of panel 26. The upper end of bracket 38 is preferably retained in a releasable coupled relationship with the panel 26. This relationship is preferably attained by a flange-like projection 48 struck from the upper corner of the panel 26. A bolt 50 extends through a hole in the projection 48 and cooperates with a wing nut 49.

A mounting strap 52 having releasably interconnectable ends is provided on the panel 26 immediately above the cable socket 36. The preferred mounting for the strap 52 includes the provision of spaced parallel slots 54 in the panel 26 and through which the strap 52 extends.

The panel 26 is preferably latched to the housing 12 adjacent its upper edge. In this regard, a bracket 56 has a flange removably bolted to the rear wall 14 and another bracket which is releasably latched to the upper edge of the panel 26 by means of bolt 58. Bolt 58 threads into a tapped hole in the upright flange of bracket 56. Other equivalent devices may be utilized to releasably latch the upper edge of panel 26 to the housing 12.

As shown more clearly in FIG. 4, the lower edge of panel 26 has a flange-like projection member 60 struck therefrom so as to define the notch or hole 62. Member 60 lies in a plane which is perpendicular to the plane of panel 26 and extends in a direction opposite from the direction of projection 40. That is, projection 40 and member 60 are on opposite sides of the panel 26.

A pin member 64 has one end secured to the projection member 60 and terminates at its other end in an enlarged head. A spring means is provided on the panel 26 in the form of a leaf spring 66 having a notch through which the pin member extends. The leaf spring 66 is preferably of spring steel and is secured to the panel 26 in any convenient manner such as by brazing, a bolt, etc. The pin member 64 facilitates the pivotable movement of the panel 26 from an upright position as shown in FIGS. 1 and 2 to an inclined position away from the rear wall 14 after the cover 22 has been removed, and the bolt 58 has been loosened.

The panel 26 is pivotably supported by a lower bracket means designated generally as 68. See FIGS. 1 and 4. The lower bracket means 68 includes a main bracket 70 having parallel flanges 72 and 74 which are preferably riveted or otherwise permanently secured to the rear wall 14. See FIG. 1. Bracket 70 also includes a forwardly directed projection member 76 having a notch 78. Member 76 is adapted to extend between member 60 and the spring 66 with the pin member 64 received in the notch 78. The spring 66 biases member 76 into engagement with member 60 in all pivotable positions of the panel 26.

As shown more clearly in FIGS. 3 and 4, the bracket 70 includes a horizontally disposed guide portion 80 having a longitudinally extending slot 82 therein. The end of guide portion 80 remote from the flange 74 includes a flange 84 which is turned upwardly and in which the size of the slot 82 has been enlarged. The guide portion 80 slidably receives and supports a flange 86 having upturned side edges 88. A bolt 90 has its head overlying the guide portion 80 with its shank extending through the slot 82 and its lower end threaded to a hole in the flange 86.

As shown more clearly in FIGS. 1 and 2, the projection member 76 is positioned so as to be substantially equidistant from the side flanges 16 and 18 on the housing 12. Also, the notch 78 in projection member 76 positions the pin member 64 at a location whereby the panel 26 is centrally located so that it may divide the interior of the housing 12 into a first or front chamber and a second or rear chamber.

As shown more clearly in FIG. 4, a main cable support bracket 92 is adjustably coupled to and supported by the bracket 70. Thus, flange 86 is integral with the bracket 92. Loosening of the bolt 90 will facilitate adjusting the bracket 92 at any desired location along the length of the slot 82. The bracket 92 includes downwardly extending hanger members 94 which terminate in perforated offset portions. Clamps are utilized to ground members 94 to a cable sheath.

A service wire bracket 96 is supported by the bracket 70 and adjustably positionable along the length of the slot 82. The bracket 96 is provided with notches 98 at its upper edge. Conductor clamps 100 are secured to the plate 96 in the notches 98. The conductor clamps 100 are multicomponent clamps which are adapted to embrace conductors. The specific construction of clamps 100 may be varied as desired.

The bracket 96 includes a flange 102 having upturned side edges 104 which receive and is supported by the guide portion 80. A bolt 106 has a head which overlies the guide portion 80 with its shank extending downwardly through the slot 82. The shank of bolt 106 is threadedly coupled to the flange 102. The size of the slot 82 in the upturned flange 84 is sufficiently large so that the head of the bolt 106 may pass therethrough. In FIG. 2, the entirety of the head of bolt 106 is visible through the slot in the flange 84.

The unassigned conductor loop may extend over and be guided by a splice support bracket 108 of ploymeric plastic or other electrical non-conductive material. See FIG. 5. Bracket 108 has a main body 110 which is disposed generally parallel to the rear wall 14. Body 110 has centrally disposed projection 112 which extends to the rear wall 14 and has flanges 114 and 116 extending in the opposite direction. The flanges 114 and 116 each have a notch 118 for cooperation with a rivet 120 to thereby retain bracket 108 in place behind the panel 26. The up portion of the unassigned loop would be on one side of projection 112 with the down portion on the other side thereof. Bracket 108 can be used as a temporary support over which conductors to be spliced may be looped.

The lower bracket means 68 is grounded to a cable sheath or other structure at a location which is below the elevation of the cover 20 and hence is never adjusted or manipulated by the operators after the initial installation. The bight of the unassigned conductor loop may be held in place in the rear chamber by a strap on the rear wall 14. Any one of various devices may be on the panel 26 and require grounding including connector block terminals, spliced connections, connection terminals, etc. Panel 26 may be provided with additional mounting holes, straps, loops or the like where desired.

In addition to facilitating grounding of panel 26 and pivoting of the same, the members 60 and 76 guide panel 26 so that it does not wobble or tilt during pivotable movement. When bolt 58 has been loosened and removed, the panel 26 is removable by exerting force in the direction of arrow 77 which removes pin member 64 from notch 78.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a multicomponent housing, said housing having at least one part which is movable to expose the interior of the housing, a panel pivotably connected to said housing, said panel being inside the housing and dividing the interior of the housing into a first chamber and a second chamber, means for grounding said panel in all pivotable positions of said panel, said grounding means including a first member on said panel and a second member in said housing, and spring means biasing said first member into contact with said second member.

2. Apparatus in accordance with claim 1 wherein said first and second members are on one side of said panel, and said movable part of the housing is on the other side of said panel.

3. Apparatus in accordance with claim 1 including a bracket in said housing for supporting wiring, said bracket being secured to said housing, said second member being a flange connected to said bracket.

4. Apparatus in accordance with claim 1 wherein said housing is an elongated housing including a channel-shaped portion which cooperates with said movable part to define an enclosure for electrically conductive wiring.

5. Apparatus in accordance with claim 1 wherein said panel pivots about a horizontal axis substantially in the center of the housing so that the first and second chambers are substantially equal.

6. Apparatus in accordance with claim 1 wherein said spring means is a leaf spring on said panel, and a pin extends through said first and second members.

7. A terminal box for telephone wiring comprising a housing having a channel-shaped portion and a removable cover, said channel-shaped portion including a rear wall and side flanges extending toward the cover, a panel dividing said housing into first and second chambers, said panel being parallel to the rear wall in one of its positions, means pivotably connecting said panel to said housing, a first electrically conductive member on said panel, a second electrically conductive member supported by said housing adjacent the pivotable axis of said panel, and spring means biasing said first and second members into contact in all pivotable positions of said panel.

8. A terminal box in accordance with claim 7 including a bracket in the housing below the elevation of said axis, said second member being electrically coupled to said bracket.

9. A terminal box in accordance with claim 7 including means on said panel for securing an electrically conductive device thereon.

10. A terminal box in accordance with claim 7 wherein said pivotable axis is adjacent one side edge of said panel, means adjacent an opposite side edge of said panel for latching said panel to said housing whereby the panel is parallel to said rear wall of the housing and substantially equidistant from the rear wall and the cover.

11. A terminal box in accordance with claim 7 including a bracket fixedly secured to said housing rear wall below the elevation of said axis, said second member being connected to said bracket, said bracket having a guide portion, at least one cable support bracket adjustably supported on said guide portion in a manner so that it may be spaced at varied distances from said rear wall of said housing.

12. A terminal box in accordance with claim 7 wherein said means pivotably connecting said panel to said housing includes only one pin member supported by said panel and extending through a hole in said second member.

13. A terminal box for telephone wiring comprising a housing having a channel-shaped portion and a removable cover, said channel-shaped portion including a rear wall and side flanges extending toward the cover, said housing having a hood at one end and being open at its other end, a panel substantially centrally located within said housing and dividing the housing into first and second chambers, said panel being generally parallel to the rear wall in one of its positions, means pivotably connecting an edge portion of said panel to said housing, a first electrically conductive member on said panel, a second electrically conductive member supported by said housing adjacent the pivotable axis of said panel, spring means on said panel biasing said first and second members into contact at all pivotable positions of the panel, an electrically conductive bracket in said housing, said second member being connected to said bracket, said bracket having a guide portion, and a cable support bracket adjustably positionable at different locations along the length of said guide portion.

14. A terminal box in accordance with claim 13 wherein said spring means is a leaf spring made from spring steel.

15. A terminal box in accordance with claim 13 including a splice support bracket secured in said housing first chamber and having a projection extending toward said rear wall so that the up and down portions of an unassigned loop will be on opposite sides of said projection, said splice support bracket being made from an electrically non-conductive plastic material.

* * * * *